(12) United States Patent
Nishikawa et al.

(10) Patent No.: US 9,497,801 B2
(45) Date of Patent: Nov. 15, 2016

(54) SEAT HEATER

(75) Inventors: Masanori Nishikawa, Shiga (JP);
Norio Abe, Shiga (JP); Kazuaki Hioki,
Shiga (JP); Yoshimitsu Fujiwara,
Shiga (JP); Kazumi Nagayama, Shiga
(JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 266 days.

(21) Appl. No.: 13/984,611

(22) PCT Filed: Apr. 18, 2012

(86) PCT No.: PCT/JP2012/002678
§ 371 (c)(1),
(2), (4) Date: Aug. 9, 2013

(87) PCT Pub. No.: WO2012/147308
PCT Pub. Date: Nov. 1, 2012

(65) Prior Publication Data
US 2013/0319991 A1 Dec. 5, 2013

(30) Foreign Application Priority Data

Apr. 27, 2011 (JP) ................................. 2011-099177

(51) Int. Cl.
*H05B 1/02* (2006.01)
*B60N 2/56* (2006.01)
(Continued)

(52) U.S. Cl.
CPC ............. *H05B 1/0238* (2013.01); *A47C 7/748* (2013.01); *B60N 2/5685* (2013.01); *H05B 3/34* (2013.01); *H05B 2203/003* (2013.01); *H05B 2203/029* (2013.01)

(58) Field of Classification Search
CPC .. A47C 7/748; B60N 2/5685; H05B 1/0238; H05B 2203/003; H05B 2203/029; H05B 3/34; H05B 1/0236; H05B 3/0042
USPC .................. 219/217, 202, 483–487, 507–511
See application file for complete search history.

(56) References Cited

U.S. PATENT DOCUMENTS 4,633,061 A * 12/1986 Arikawa ................ A47C 7/748
219/202
8,637,795 B2 * 1/2014 Giri ...................... H05B 1/0227
219/483

(Continued)

FOREIGN PATENT DOCUMENTS

CN 101663180 A 3/2010
CN 201633590 U 11/2010

(Continued)

OTHER PUBLICATIONS

Extended European Search Report in corresponding European Application No. 12777821.5, dated Sep. 2, 2014, 6 pages.

(Continued)

*Primary Examiner* — Dana Ross
*Assistant Examiner* — James Sims, III
(74) *Attorney, Agent, or Firm* — Brinks Gilson & Lione

(57) ABSTRACT

The seat heater of the present invention comprises: a warming heater provided in a seat section of a seat; a warming heater provided in a back section; an overheating-prevention unit; and a heating unit that heats the overheating-prevention unit, the overheating-prevention unit being configured by a non-return type temperature switch. This configuration allows activating the non-return type overheating-prevention unit prior to reaching an unsafe event, and turns the warming heaters OFF reliably, whereby a seat heater with an aim of implementing both high output and safety can be provided.

2 Claims, 4 Drawing Sheets

(51) Int. Cl.
*A47C 7/74* (2006.01)
*H05B 3/34* (2006.01)

(56) References Cited

U.S. PATENT DOCUMENTS

| | | | |
|---|---|---|---|
| 2009/0095725 A1* | 4/2009 | Ohashi | B60N 2/5685 219/202 |
| 2010/0096379 A1 | 4/2010 | Asami et al. | |
| 2011/0061401 A1 | 3/2011 | Jun et al. | |

FOREIGN PATENT DOCUMENTS

| | | | | |
|---|---|---|---|---|
| CN | 102019865 A | | 4/2011 | |
| DE | 33 04 419 A1 | | 8/1983 | |
| DE | 3304419 A1 | * | 8/1983 | ............... B60H 1/00 |
| JP | 03-226984 A | | 10/1991 | |
| JP | 06-301427 A | * | 10/1994 | ............. G05B 23/24 |
| JP | 2000-342382 A | | 12/2000 | |
| JP | 2002-270338 A | | 9/2002 | |
| JP | 2003-109721 A | | 4/2003 | |
| JP | 2003-332030 A | | 11/2003 | |

OTHER PUBLICATIONS

International Search Report for International Application No. PCT/JP2012/002678, dated May 22, 2012, 2 pages.

* cited by examiner

SEAT HEATER

This application is a 371 application of PCT/JP2012/002678 having an international filing date of Apr. 18, 2012, which claims priority to JP2011-099177 filed Apr. 27, 2011, the entire contents of which are incorporated herein by reference.

TECHNICAL FIELD

The present invention relates to a seat heater that warms a seat in a vehicle or the like.

BACKGROUND ART

A known conventional seat heater is a seat heater which is installed respectively in a seat section and a back section of a seat of a vehicle, where electric heater lines are installed on the entire surface of a base material in a zigzag design at a predetermined pitch, between the surface covering and the main pad. In the case of such a conventional seat heater, the seat heater heats up when the electric heater lines are turned ON, and thereby a user sitting on the seat can be comfortably warmed even during the cold season.

FIG. 4 is a circuit diagram of a conventional seat heater. The seat heater shown in FIG. 4 comprises a heater for heating the seat section 401a, a heater for heating the back section 401b, an overheating-prevention unit 402, and a heating unit 403. The overheating-prevention unit 402 is heated by the heating unit 403, and turns the heaters 401a and 401b OFF if the temperature reaches a predetermined temperature.

In the case of the conventional seat heater, turning the heaters 401a and 401b ON/OFF is controlled by such a temperature control unit (not illustrated) as a thermostat or controller. If control of turning the heaters 401a and 401b ON/OFF is interrupted due to failure of the temperature control unit, for example, the temperature of the seat section and the back section increases, exceeding the predetermined temperature.

Therefore in the conventional seat heater, the overheating-prevention unit 402 turns the heaters 401a and 401b OFF if the temperature of the heaters 401a and 401b exceeds the predetermined temperature, so as to ensure safety.

A return type temperature switch is used as the overheating-prevention unit 402 of the conventional seat heater. Because even if the temperature in the interior of the vehicle becomes high and the overheating-prevention unit 402 turns the heaters 401a and 401b OFF, the heaters 401a and 401b can be turned ON again when the temperature in the interior of the vehicle returns to normal temperature (e.g. Patent Document 1).

Recently hybrid vehicles and electric vehicles have started to be popular, however in these vehicles the exhaust heat of the engines is low. Therefore in these vehicles, heating the interior of the vehicle is becoming more difficult compared with vehicles that use only the engine as the power source. Therefore a seat heater which directly warms the human body is receiving attention, and further improvements in performance, particularly improvement in the warmup performance, are demanded. Hence higher output (higher power consumption) and higher density of heater wiring are necessary.

However in the case of the seat heater according to Patent Document 1, the overheating-prevention unit 402 is a return type. This means that even if the heaters 401a and 401b are turned OFF because a temperature abnormality is detected, the overheating-prevention unit 402 turns the heaters 401a and 401b ON again when temperature drops thereafter. Therefore if the output of the conventional seat heater is increased, temperature rises, and the comfort and safety of the driver (passenger) diminishes, which is a problem.

Patent Document 1: Japanese Patent Application Laid-Open No. 2003-109721

SUMMARY OF THE INVENTION

It is an object of the present invention to provide a seat heater which can ensure comfort and safety even if the output of the seat heater is increased.

A seat heater according to an embodiment of the present invention comprises: a first warming heater that warms a seat section of a seat; a second warming heater that warms a back section of the seat; an overheating-prevention unit that prevents overheating of the first warming heater and the second warming heater; and a heating unit that heats the overheating-prevention unit, wherein the overheating-prevention unit is configured by a non-return type temperature switch.

DESCRIPTION OF EMBODIMENTS

Embodiments of the present invention will now be described with reference to the drawings. The present invention, however, shall not be limited by the embodiments.

(Embodiment 1)

Figure 1:
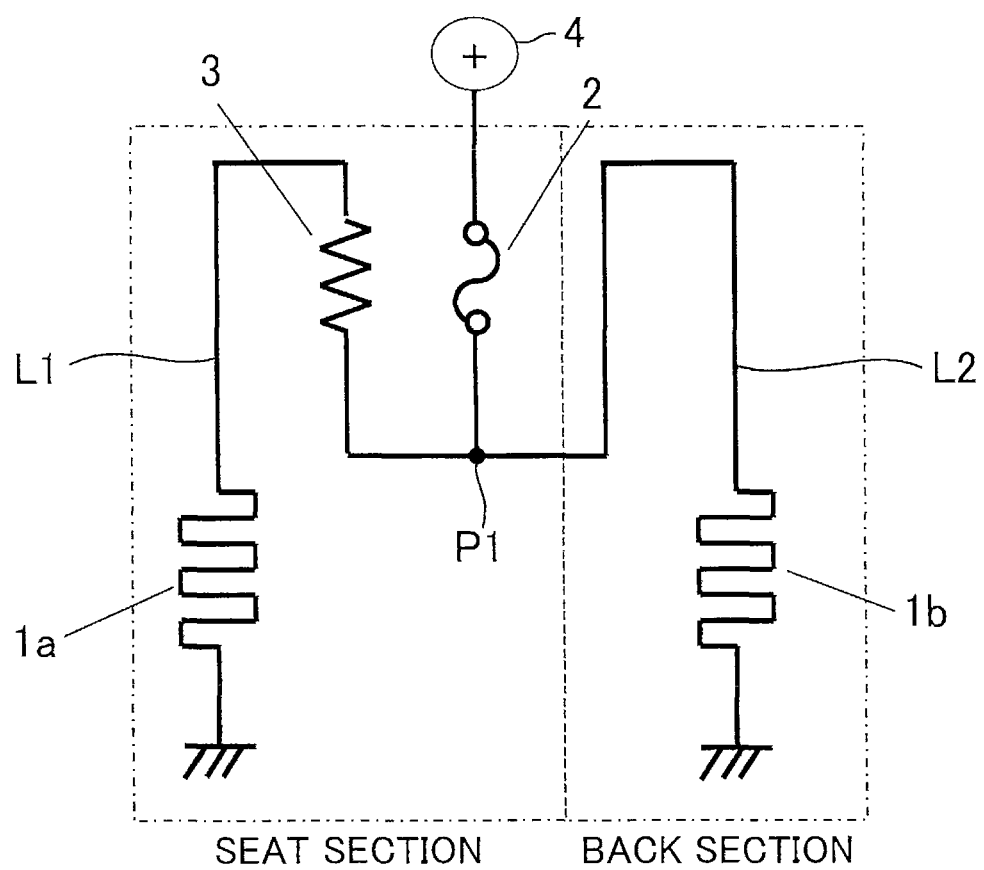
FIG. 1 is a circuit diagram of a seat heater according to Embodiment 1 of the present invention.

A seat heater of Embodiment 1 of the present invention will be described with reference to FIG. 1. FIG. 1 is a circuit diagram of the seat heater according to Embodiment 1 of the present invention.

The seat heater shown in FIG. 1 is installed in a seat (not illustrated) of a vehicle, for example, and warms a seat section and a back section of the seat. In concrete terms, the seat heater shown in FIG. 1 has a warming heater 1a (an example of the first warming heater), a warming heater 1b (an example of the second warming heater), an overheating-prevention unit 2 and a heating unit 3.

The warming heater 1a warms the seat section. And the warming heater 1b warms the back section. Here each of the warming heaters 1a and 1b is configured by a flat base material of non-woven fabric, urethane or the like, on which electric heater lines are wired in a zigzag way with a predetermined pitch.

Operation and functions of the seat heater configured like this will be described.

The temperature of the warming heaters 1a and 1b is controlled by a temperature control unit, such as a thermostat or a controller. If a controller is used as the temperature control unit, the controller controls the warming heaters 1a and 1b using temperature detection signals of the warming heaters 1a and 1b, for example, which are outputted from a temperature detection element, such as a thermistor.

In other words, the temperature control unit performs the ON/OFF operation, that is it turns the warming heaters 1a and 1b OFF at a point when the temperature of the warming heaters 1a and 1b reaches a predetermined temperature, and turns the warming heaters 1a and 1b ON again when the temperature of the warming heaters 1a and 1b drops to a predetermined temperature, or when a predetermined time elapses after the turning OFF operation. Thereby the temperature is controlled so that the surface of the seat has a comfortable temperature.

If the temperature control unit fails and normal temperature control is disabled, it is possible that the warming heaters 1a and 1b will constantly remain ON. In this case, the surface temperature of the seat will rise and cause the user discomfort, or may even create an unsafe situation, such as smoking and ignition. Therefore the seat heater of this embodiment includes the overheating-prevention unit 2, and the heating unit 3 that heats the overheating-prevention unit 2, separately from the temperature control unit. Thereby if the temperature control unit fails and the heaters are constantly ON, the overheating-prevention unit 2 is heated by the heating unit 3. Then the warming heaters 1a and 1b can be turned OFF when the warming heaters 1a and 1b reach a predetermined temperature.

In the conventional seat heater, a return type temperature switch is used as the overheating-prevention unit 2. Therefore even if the warming heaters 1a and 1b are turned OFF by the overheating-prevention unit 2 (OFF operation) when the temperature in the vehicle interior becomes high, the warming heaters 1a and 1b are turned ON again by the overheating-prevention unit 2 (ON operation) when the temperature in the vehicle interior drops.

Further, in the conventional seat heater, the heat generation density of the warming heaters 1a and 1b are controlled to be a predetermined density or less, considering the case of failure of the overheating-prevention unit 2. Thereby the temperature of the warming heaters 1a and 1b can stop rising at a temperature where safety is assured.

Hybrid vehicles and electric vehicles have recently become popular. In these vehicles, the exhaust heat of the engine is low compared with a vehicle which uses only the engine as a power source, hence heating the vehicle interior is becoming more difficult. For such vehicles, a seat heater which directly heats the human body and therefore has good thermal efficiency is attracting attention, and further improvement in performance, particularly an improvement in temperature rise performance, is demanded.

To implement this, it is indispensable for the warming heaters 1a and 1b to further increase output (increase power consumption) and density of heater wiring. In the case of the conventional seat heater, it is difficult to control the heat generation density and stops the rise of the temperature of the warming heaters 1a and 1b at a temperature where safety is assured.

Therefore according to this embodiment, a non-return type temperature switch is used as the overheating-prevention unit 2. Because of this, if the temperature of the warming heaters 1a and 1b becomes an abnormal temperature due to failure of the temperature control unit, which is unsafe, the overheating-prevention unit 2 can turn the warming heaters 1a and 1b OFF. As a result, further heating of the seat heater can be reliably prevented, and safety can be improved. Furthermore, in order to increase output and heat generation density of the seat heater, a temperature to activate the overheating-prevention unit 2 to turn the warming heaters 1a and 2b OFF can be set to a relatively high temperature. Thereby the temperature to activate the overheating-prevention unit 2 can be set to a temperature zone that exceeds the normal temperature range of the vehicle interior.

In order to increase the output of the warming heaters 1a and 1b, the total resistance value of the warming heaters 1a and 1b must be decreased, and for this purpose, the resistance values of the warming heaters 1a and 1b must be decreased by making the heater lines thicker. However making the heater lines thicker increases cost, and drops product value since heater lines more easily rise to the surface of the seat.

Therefore according to this embodiment, the warming heaters 1a and 1b are connected in parallel as a parallel circuit. In concrete terms, the warming heater 1a is installed on one route L1 of the parallel circuit, and the warming heater 1b is installed on the other route L2 of the parallel circuit. Thereby current that flows through the warming heaters 1a and 1b is reduced, and a high output seat heater can be configured without making the heater lines thicker to decrease the resistance values of the warming heaters 1a and 1b. Furthermore according to this embodiment, the overheating-prevention unit 2 is connected to the parallel circuit via a branch point P1 between the route L1 and the route L2. In other words, the overheating-prevention unit 2 is disposed before the point of branching into the route L1 and the route L2 in the parallel circuit. As a result, when an abnormality is generated, the overheating-prevention unit 2 can turn both the warming heaters 1a and 1b OFF, and the seat heater which has high product value and high safety can be provided. One end of the overheating-prevention unit 2 is connected to the branching point P1, and the other end is connected to a power supply unit 4.

In concrete terms, one end of the route L1 is grounded, and the other end is the branch point P1. The heating unit 3 is disposed on the route L1. Although the heating unit 3 is disposed on the route L1 in the example of FIG. 1, heating unit 3 is not limited to this configuration, but may be disposed on the route L2. One end of the route L2 is grounded, and the other end is the branch point P1.

According to this embodiment, a return type overheating-prevention unit T (e.g. Thermostat T, see FIG. 2), of which activation temperature is lower than the overheating-prevention unit 2, may be disposed separately from the overheating-prevention unit 2, which is configured by the non-return type temperature switch. Thereby further safety improvement can be implemented. In other words, if the temperature control unit fails, the return type overheating-prevention unit T is activated and turns the warming heaters 1a and 1b OFF, so as to prevent abnormal rise of temperature of the warming heaters 1a and 1b. If the return type overheating-prevention unit T also fails, then the non-return type overheating-prevention unit 2 is activated, and turns the warming heaters 1a and 1b OFF. Thereby the warming heaters 1a and 1b are completely turned OFF, and safety of the seat heater can be further improved.

For the non-return type temperature switch constituting the overheating-prevention unit 2, a temperature fuse, a thermostat that returns at a very low temperature, or a thermostat which can be manually returned by a button operation by the user, for example, can be used.

The temperature to activate the overheating-prevention unit 2 can be determined to a temperature where safety is ensured, considering the melting temperature and ignition temperature of the peripheral components of the seat heater.

(Embodiment 2)

Figure 2:
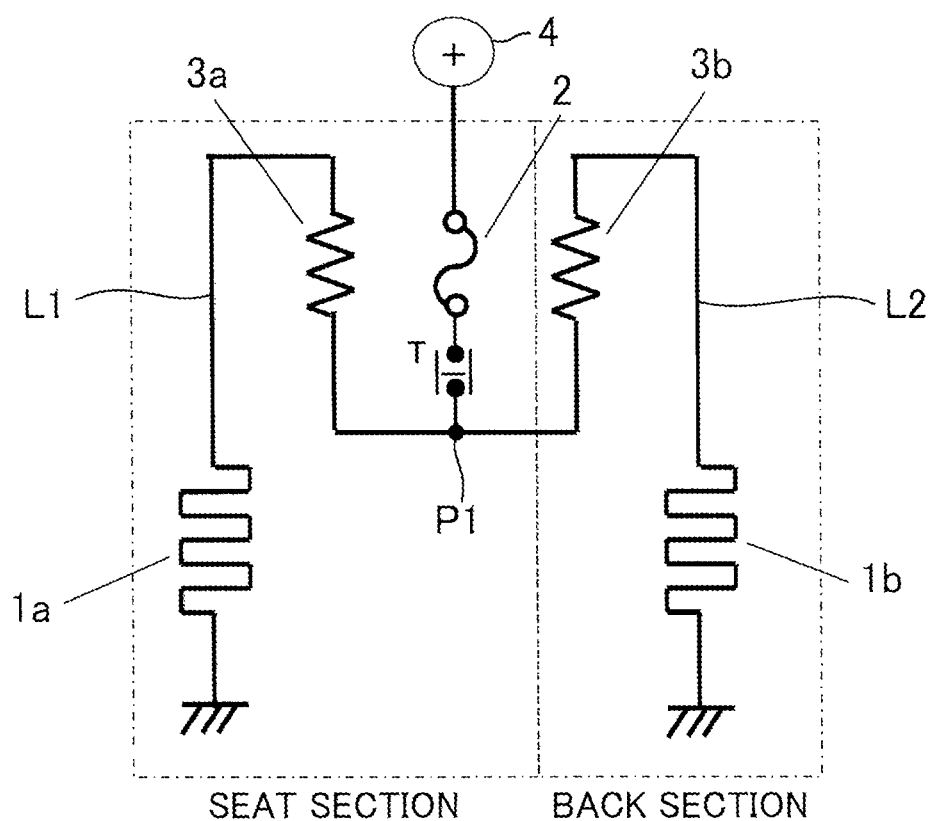
FIG. 2 is a circuit diagram of a seat heater according to Embodiment 2 of the present invention.

FIG. 2 is a circuit diagram of a seat heater according to Embodiment 2 of the present invention. In this embodiment, a composing element the same as Embodiment 1 is denoted with a same reference symbol, for which description is omitted.

In the seat heater according to Embodiment 2, the heating unit 3 has a heating heater 3a (an example of the first heating heater) which is electrically connected to the warming heater 1a, and a heating heater 3b (an example of the second heater) which is electrically connected to the warming heater 1b. In other words, the heating heater 3a is disposed on the route L1 and the heating heater 3b is disposed on the route L2.

In the case of disposing the heating heater on only one of the route L1 and route L2, the heating heater disposed on route L1, for example, cannot heat the overheating-prevention unit 2 if the warming heater on the route L1, on which the heating heater is disposed, is disconnected. In this case, if a temperature abnormality occurs, the overheating-prevention unit 2 may not be able to turn the warming heaters 1a and 1b OFF.

Therefore in this embodiment, the heating heaters 3a and 3b are disposed. Thereby even if one of the warming heaters on the route L1 or route L2 is disconnected, the overheating-prevention unit 2 can be heated by the heating heater on the other route, and the overheating-prevention unit 2 can be activated. As a result, even if two components fail (failure of overheating-prevention unit and disconnection of a warming heater), safety can be assured.

Since a load stress due to body weight of the user is often applied to the seat section, it is quite possible that a disconnection of the warming heater 1a and the heating heater 3a occurs. Therefore according to this embodiment, the calorific value of the heating heater 3b is higher than the heating heater 3a. In other words, even if the heating heater 3a is disconnected, the overheating-prevention unit 2 can be activated reliably by heating of the heating heater 3b of which calorific value is higher, and a seat heater having high safety can be provided.

(Embodiment 3)

Figure 3:
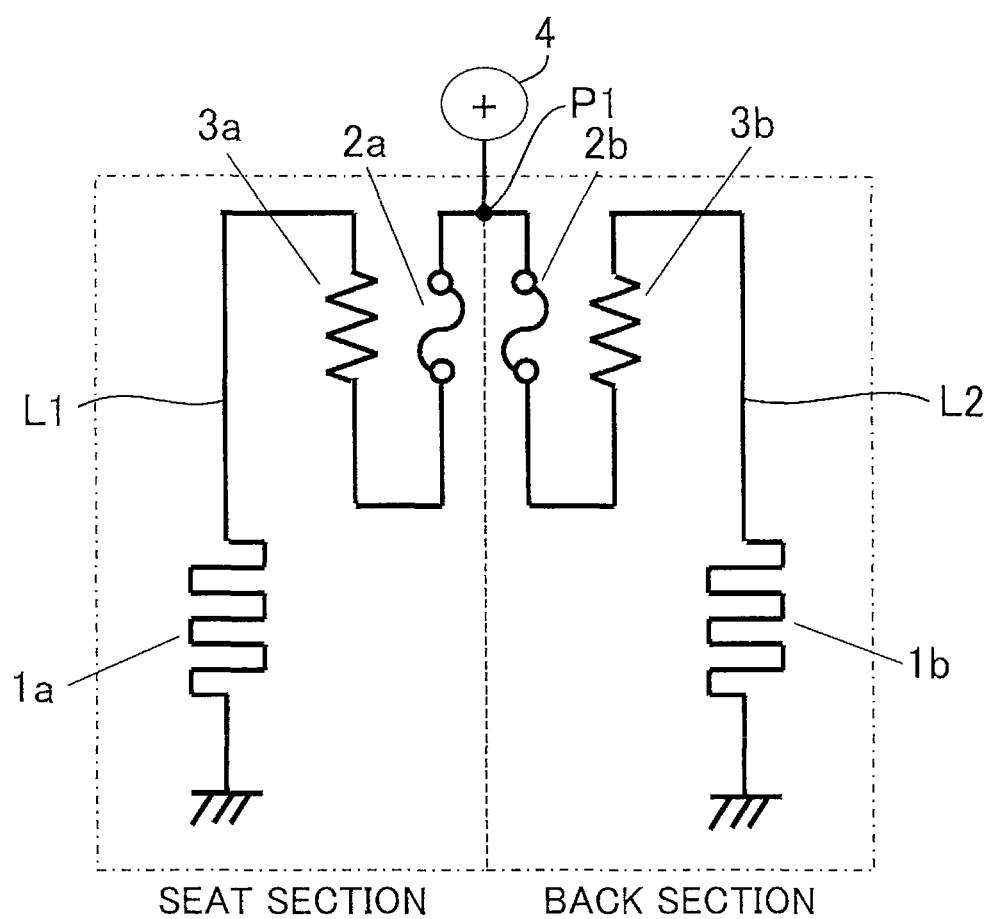
FIG. 3 is a circuit diagram of a seat heater according to Embodiment 3 of the present invention.
Figure 4:
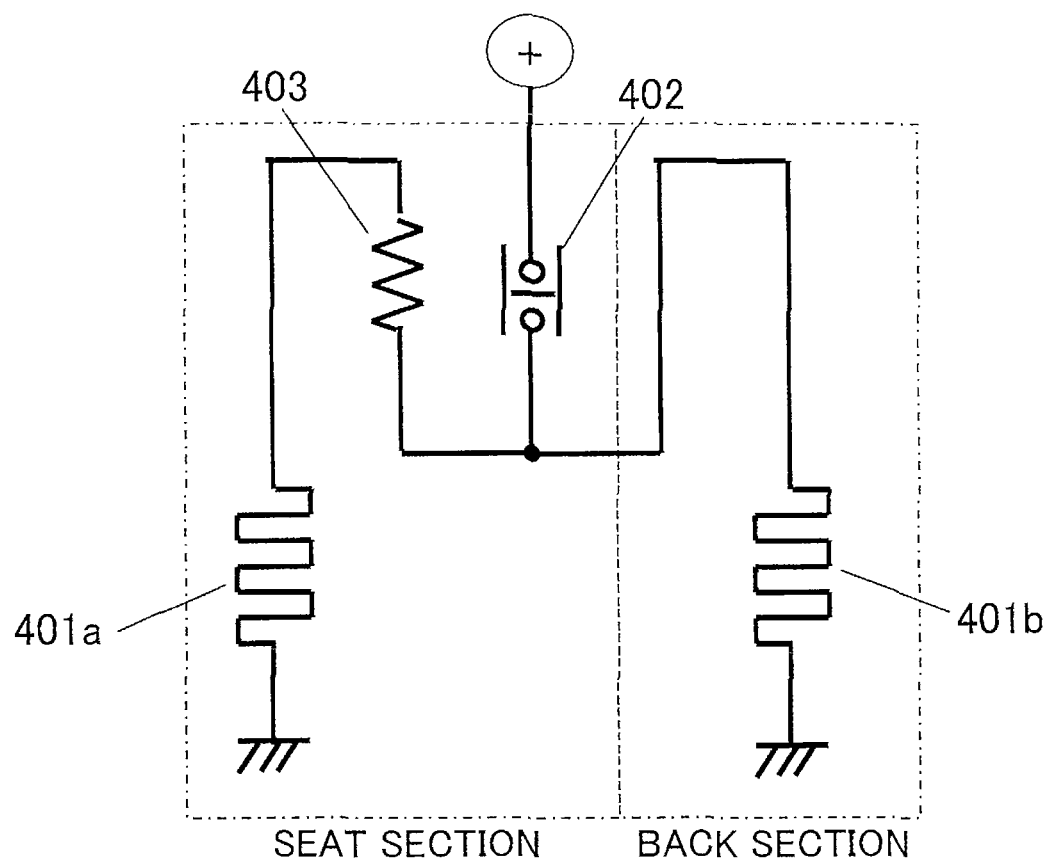
FIG. 4 is a circuit diagram of a conventional seat heater.

FIG. 3 is a circuit diagram of a seat heater according to Embodiment 3 of the present invention. In this embodiment, a composing element the same as Embodiment 1 or 2 is denoted with a same reference symbol, for which description is omitted.

The seat heater according to Embodiment 3 is the seat heater according to Embodiment 2 where the overheating-prevention unit 2 is configured by two overheating-prevention units 2a and 2b, the overheating-prevention unit 2a is disposed on the route L1, and the overheating-prevention unit 2b is disposed on the route L2.

By disposing the overheating-prevention units 2a and 2b on the routes L1 and L2 respectively, current that flows to each overheating-prevention unit 2a and 2b is reduced. This allows the overheating-prevention units 2a and 2b to be downsized. Therefore disposing the overheating-prevention unit in the seat becomes easier, and the overheating-prevention unit moving up to the surface of the seat can be controlled, which improves ease of use.

In Embodiment 1 to 3, the overheating-prevention unit 2 (2a, 2b) may be mechanically secured inside the seat by a hot melt adhesive or by metal fittings. Then displacement or detachment of the overheating-prevention unit 2 (2a, 2b) due to load stress can be suppressed, and an abnormal state can be stably detected. As a result, a seat heater, in which an abnormal rise in temperature of the warming heaters 1a and 1b can be reliably prevented, can be provided.

The seat heater according to Embodiment 1 to 3 may be used for a seat of a hybrid vehicle or electric vehicle, or may be used for a seat of a vehicle that uses an engine as a power source, or may be used for a seat of a two-wheeled vehicle or bicycle, or may be used for a chair (e.g. sofa).

(Summary of Seat Heater of Embodiments)

The seat heater according to this embodiment comprises: a first warming heater that warms a seat section of a seat; a second warming heater that warms a back section of the seat; an overheating-prevention unit that prevents overheating of the first warming heater and the second warming heater; and a heating unit that heats the overheating-prevention unit, wherein the overheating-prevention unit is configured by a non-return type temperature switch.

According to this configuration, the non-return type temperature switch is used for the overheating-prevention unit. Hence the non-return type overheating-prevention unit activates before an unsafe event is generated, and the heater can be reliably turned OFF. As a result, a safer seat heater can be provided while increasing the output of the seat heater.

In the seat heater, the first warming heater and the second warming heater may be connected in parallel by a parallel circuit, and the overheating-prevention unit may be connected to the parallel circuit via a branch point of the parallel circuit.

According to this configuration, the entire heater can be reliably turned OFF when an abnormality is generated, and a safer seat heater can be provided.

In the seat heater, the heating unit may include a first heating heater that is electrically connected to the first warming heater and a second heating heater that is electrically connected to the second warming heater.

According to this configuration, even if one of the first warming heater and the second warming heater is disconnected, the overheating-prevention unit is heated by a heating heater connected to the non-disconnected warming heater reliably, and safety can be ensured even in the case of a warming heater being disconnected.

In the seat heater, a calorific value of the second heating heater may be higher than a calorific value of the first heating heater.

The load stress applied due to the user sitting on the seat is greater in the seat section than in the back section. Therefore in this configuration, a calorific value of the second heating heater installed in the back section is higher than a calorific value of the first heating heater installed in the seat section. Thereby even if the first heating heater is disconnected by the load stress applied due to the user sitting, the overheating-prevention unit can be reliably activated by heating of the second heating heater having the higher calorific value, and safety can be improved.

In the seat heater, the first warming heater may be installed on one route of the parallel circuit, the second warming heater may be installed on the other route of the parallel circuit, and the overheating-prevention unit may include a first overheating-prevention unit that is installed on the one route, and a second overheating-prevention unit that is installed on the other route.

According to this configuration, current that flows to each overheating-prevention unit can be decreased, and a more compact overheating-prevention unit can be used. Therefore an installation space of the overheating-prevention unit can be decreased inside the seat, and the overheating-prevention unit moving up to the surface of the seat can be controlled.

In the seat heater, the overheating-prevention unit may be mechanically secured to the seat.

According to this configuration, the thermal coupling between the overheating-prevention unit and the heating unit is guaranteed. And as a result, the overheating-prevention unit is reliably activated when an abnormality is generated, and safety can be improved.

INDUSTRIAL APPLICABILITY

As described above, according to the present invention, a high output seat heater can be provided for heating of a seat of an automobile, which can also be applied to the heating of a seat of a vehicle other than an automobile and to personal heating in a residence.

The invention claimed is:

1. A seat heater for use in a seat having a seat section and a back section, comprising:
   a first warming heater that warms the seat section of a seat;
   a second warming heater that warms the back section of the seat;
   a single overheating-prevention unit that prevents overheating of the first warming heater and the second warming heater;
   a heating unit that heats the single overheating-prevention unit;
   a parallel circuit that connects the first warming heater and the second warming heater in parallel with each other, and having a branch point; and
   wherein the single overheating-prevention unit comprises both a return type overheating-prevention unit and a non-return type temperature switch, wherein the non-return type temperature switch is heated by the heating unit and the non-return type temperature switch having an activation temperature higher than the return type overheating-prevention unit, and the single overheating-prevention unit is connected to the parallel circuit via the branch point of the parallel circuit;
   the heating unit includes:
   a first heating heater installed in the seat section, and electrically connected to the first warming heater, and
   a second heating heater installed in the back section, and electrically connected to the second warming heater,
   the second heating heater having a caloric value higher than that of the first heating heater.

2. The seat heater according to claim 1, wherein the overheating-prevention unit has a mechanical part which is mechanically secured to the seat.

\* \* \* \* \*